United States Patent
Senarath et al.

(10) Patent No.: US 6,907,271 B2
(45) Date of Patent: Jun. 14, 2005

(54) MULTIBEAM WIRELESS COMMUNICATIONS METHOD AND SYSTEM INCLUDING AN INTERFERENCE AVOIDANCE SCHEME IN WHICH THE AREA OF EACH TRANSMITTED BEAM IS DIVIDED INTO A PLURALITY OF SUB-AREAS

(75) Inventors: Nimal G. Senarath, Nepean (CA); Robert Matyas, Nepean (CA); Leo L. Strawczynski, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 834 days.

(21) Appl. No.: 09/939,231

(22) Filed: Aug. 24, 2001

(65) Prior Publication Data

US 2003/0008654 A9 Jan. 9, 2003

Related U.S. Application Data

(63) Continuation-in-part of application No. 09/710,085, filed on Nov. 10, 2000.

(51) Int. Cl.⁷ ............................................... H04M 1/00
(52) U.S. Cl. ................ 455/562.1; 455/561; 455/67.11; 455/450; 455/452.2
(58) Field of Search ................................ 455/560–561, 455/562.1, 25, 63, 450–451, 452.1–2, 446–447, 440, 443, 63.1–4, 67.11–13, 509; 342/371–375, 56, 81, 96; 370/345, 347–348

(56) References Cited

U.S. PATENT DOCUMENTS

| | | | | |
|---|---|---|---|---|
| 6,070,090 A | * | 5/2000 | Feuerstein | ................ 455/561 |
| 6,167,286 A | * | 12/2000 | Ward et al. | ............... 455/562.1 |
| 6,181,276 B1 | * | 1/2001 | Schlekewey et al. | ........ 342/372 |
| 6,314,305 B1 | * | 11/2001 | Solondz et al. | ........... 455/562.1 |
| 6,397,082 B1 | * | 5/2002 | Searle | ...................... 455/562.1 |
| 6,453,176 B1 | * | 9/2002 | Lopes et al. | ............. 455/562.1 |
| 6,597,927 B1 | * | 7/2003 | Eswara et al. | ............... 370/334 |
| 2001/0034236 A1 | * | 10/2001 | Tong et al. | .................. 455/450 |
| 2003/0008654 A9 | | 1/2003 | Senarath et al. | |

FOREIGN PATENT DOCUMENTS

WO  0154301  7/2001

\* cited by examiner

*Primary Examiner*—Lee Nguyen
*Assistant Examiner*—Tuan Tran
(74) *Attorney, Agent, or Firm*—Dennis R. Haszko; Borden Ladner Gervais LLP

(57) ABSTRACT

A method for reducing interference in a wireless system, and a system for performing the method. The wireless system should include at least two, and preferably four, beam formers and a plurality of mobile units. The method includes the steps of transmitting beams B1, B2, B3 and B4 into first, second, third and fourth beam areas, respectively. At least two sub-areas are defined within each of the first, second, third and fourth beam areas based upon the degree of overlap with adjacent beam areas, whereby each of the beam areas includes at least one overlapping sub-area and at least one non-overlapping sub-area. The method further includes coding signals of the beams B1, B2, B3 and B4 for receipt by a particular mobile unit based upon which one of the sub-areas that the particular mobile unit is located within.

31 Claims, 5 Drawing Sheets

MULTIBEAM WIRELESS COMMUNICATIONS METHOD AND SYSTEM INCLUDING AN INTERFERENCE AVOIDANCE SCHEME IN WHICH THE AREA OF EACH TRANSMITTED BEAM IS DIVIDED INTO A PLURALITY OF SUB-AREAS

CROSS-REFERENCE TO RELATED APPLICATIONS

This application is a continuation-in-part of U.S. patent application Ser. No. 09/710,085, filed on Nov. 10, 2000, the contents of which are hereby incorporated by reference into this application as if set forth herein in full.

FIELD OF THE INVENTION

The present invention relates generally to the field of wireless communications, and more particularly to multi-beam wireless communications systems and methods in which interference from adjacent beams is minimized, without unduly reducing capacity, by dividing each beam area into at least two sub-areas.

BACKGROUND OF THE INVENTION

One of the many current uses of wireless communication principles is within a cellular network, such as the cellular networks employed by the increasingly popular cellular telephone systems. In such systems, the geographical area is divided into a plurality of adjoining cells, such as cells 12 of a network 10 of FIG. 1. Mobile units (such as cellular telephones) move about the geographical area encompassed by the cellular array, and information is transmitted to/from the mobile units from/to a base transmitter station (BTS).

One type of cellular arrangement common in North America is known as the center excitation arrangement, whereby a BTS is situated within the center of each cell. FIG. 2 schematically depicts one cell 12 of a center excitation arrangement, whereby BTS 14 transmits a downlink radiation beam into each of the three sectors 16, 18, and 20. In the FIG. 2 example, each sector 16, 18, and 20 is covered by a beam with a 120° azimuth angle, so that full 360° coverage is provided by the three beams of BTS 14. It should be noted that the sectors may be divided differently, such as by having six beams each having a 60° azimuth angle, twelve beams each having a 30° azimuth angle, etc., so long as the full 360° of coverage is provided by the combination of beams. It should also be noted that multiple beams may be used in each sector. Although the intention is to cover only the area specified by the azimuth angle of the beam, practically, the signal spreads over a larger area, giving rise to interference (which will be discussed in more detail below).

There is also a second type of excitation arrangement, known as edge excitation, which is commonly used in Europe. In such an arrangement (not shown in the figures), the BTS is situated at the intersection of three cells, and beams are directed towards the center of each cell. In contrast, in the center excitation arrangement discussed above, the BTS is situated at the center of a cell, and the beams are directed outwardly from the BTS.

There is a need in cellular systems (both edge excitation and center excitation systems) to provide more capacity to transmit information over the beams to the mobile units. Theoretically, capacity gains can be realized by increasing the number of beams, since each beam can carry a certain amount of information. Thus, in theory, a system using four beams per sector will have a greater capacity than one with three beams per sector.

However, the present inventors have realized that, in practice, some of the expected capacity gains are often diminished by interference received from adjacent beams. This is the case because beams are not transmitted along an exact azimuth angle, so there will be some overlap between adjacent beams. For example, referring to FIG. 2, since the exact angle of 120° cannot be created, there will be some overlap between the beam of sector 16 and the beam of sector 18 around line 22. Similar beam overlap occurs around line 24 between the beam of sector 18 and the beam of sector 20, as well as around line 26 between the respective beams of sectors 16 and 20. Such overlaps cause interference that diminishes the capacity of the system below the capacity that would otherwise be expected.

For example, the present inventors' simulation results showed a slight loss of capacity when increasing the number of beams from three per sector to four per sector (i.e., when changed from nine beams per cell to twelve beams per cell). Although one would expect an increase in cell capacity due to the increased number of simultaneous beams in the cell, the loss due to increased beam interference was larger than the gain obtained from increasing the number of beams. Thus, it is desirable to find a way to increase capacity, without increasing interference.

BRIEF SUMMARY OF THE INVENTION

The present invention provides a method for reducing interference in a wireless system, and a system for performing the method. Although the proposed scheme can be employed in systems with any number of beams, the performance gain will be lower with a smaller number of beams. In the sample embodiments discussed below, four beam formers are used per sector, as well as a plurality of mobile units. The method includes the steps of transmitting beams B1, B2, B3 and B4 into first, second, third and fourth beam areas, respectively. At least two sub-areas are defined within each of the first, second, third and fourth beam areas based upon the degree of overlap with adjacent beam areas, whereby each of the beam areas includes at least one overlapping sub-area and at least one non-overlapping sub-area. It should be noted that the term "overlapping areas" refers to areas receiving excessive interference from other beams, and that a geographical relationship may or may not exist.

The method further includes coding signals of the beams B1, B2, B3 and B4 for receipt by a particular mobile unit based upon which one of the sub-areas that the particular mobile unit is located within.

If the invention is practiced with a TDM scheme (time division multiplex), at least three time periods are utilized, wherein during the first time period (T1), simultaneous transmissions are made for receipt by mobile units located within sub-areas $G1_1$, $G1_2$, $G1_3$ and $G1_4$; during a second time period (T2), transmissions are made for receipt by mobile units located within sub-areas $G2_1$ and $G2_4$; and during a third time period (T3), transmissions are made for receipt by mobile units located within sub-areas $G2_2$ and $G2_3$.

If the invention is practiced with an FDM scheme (frequency division multiplex), the group of frequencies assigned to each cell is divided such that half of the frequencies (F1) serve mobile units located within sub-areas $G1_1$, $G1_2$, $G1_3$ and $G1_4$, and the other half of the frequencies (F2) serve mobile units located within sub-areas $G2_1$, $G2_2$, $G2_3$ and $G2_4$. The F2 set of frequencies is further divided into two groups, $F2_1$ and $F2_2$, with $F2_1$ serving $G2_1$ and $G2_3$ and $F2_2$ serving $G2_2$ and $G2_4$.

Another extension of the present invention is called a "Rotation Beam Arrangement." Under the TDM version of this implementation, we introduce two more mobile areas for each beam and an additional three time slots for transmission. All the beams will be rotated by half of the average beam coverage angle, and the rotated G1/G2 areas, which will be called $RG1_1$, $RG1_2$, $RG1_3$, $RG1_4$, $RG2_1$, $RG2_2$, $RG2_3$ and $RG2_4$, are defined similar to the original beam areas $G1_1$, $G1_2$, $G1_3$, $G1_4$, $G2_1$, $G2_2$, $G2_3$ and $G2_4$. Now a mobile will be assigned to one of these eight areas according to the best C/I (carrier to interference ratio), and transmissions to those mobiles will be done during the corresponding time slot, as explained below.

T1: $G1_1$, $G1_2$, $G1_3$, $G1_4$
T2: $G2_1$ and $G2_4$
T3: $G2_2$ and $G2_3$
T4: $RG1_1$, $RG1_2$, $RG1_3$, $RG1_4$
T5: $RG2_1$ and $RG2_4$
T6: $RG2_2$ and $RG2_3$ As explained below, under this rotated beam arrangement, more mobiles will be assigned to G1 or inner beam areas (rotated or original) since most of the mobiles in the original G2 area would now be covered by the rotated G1 positions. This increases the proportion of time system transmit with a reuse factor of 1, thus providing a higher throughput. Moreover, this "Rotation Beam Arrangement" scheme does not require additional antennas.

Although the "Rotation Beam Arrangement" scheme is described using two rotated positions, a system can be designed with n rotated positions by rotating the beams by 1/n th of beamwidth each time. Depending on the degree of overlap among adjacent beams, there may be an optimum number of rotated positions. One of ordinary skill in the art should be able to extend this invention to different numbers of rotated positions.

DETAILED DESCRIPTION OF THE INVENTION

There will now be described by way of example the best mode contemplated by the inventors for carrying out the present invention. In the following description, numerous specific details will be set forth in order to provide a thorough understanding of the present invention. It should be apparent to those of ordinary skill in the art that the present invention may be practiced without using these specific details. In other instances, well-known methods and structures have not been described in detail so as not to unnecessarily obscure the present invention.

Figure 1:
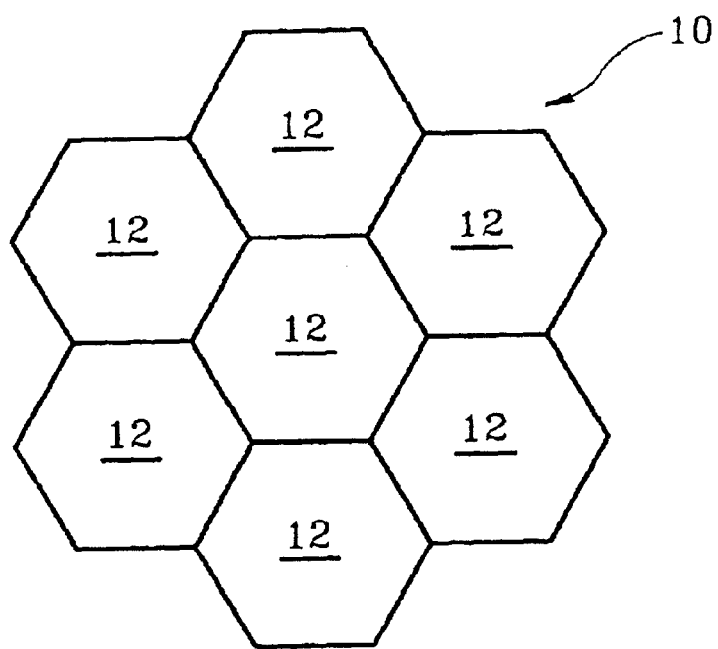
FIG. 1 is a schematic drawing of a cell cluster of a standard cellular network.
Figure 2:
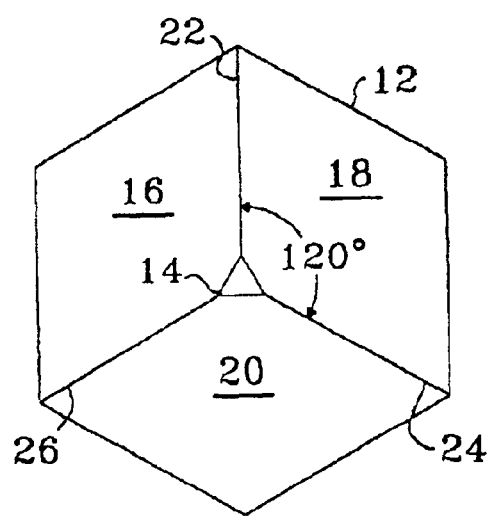
FIG. 2 is a schematic representation of a cell with a center excitation arrangement.
Figure 3:
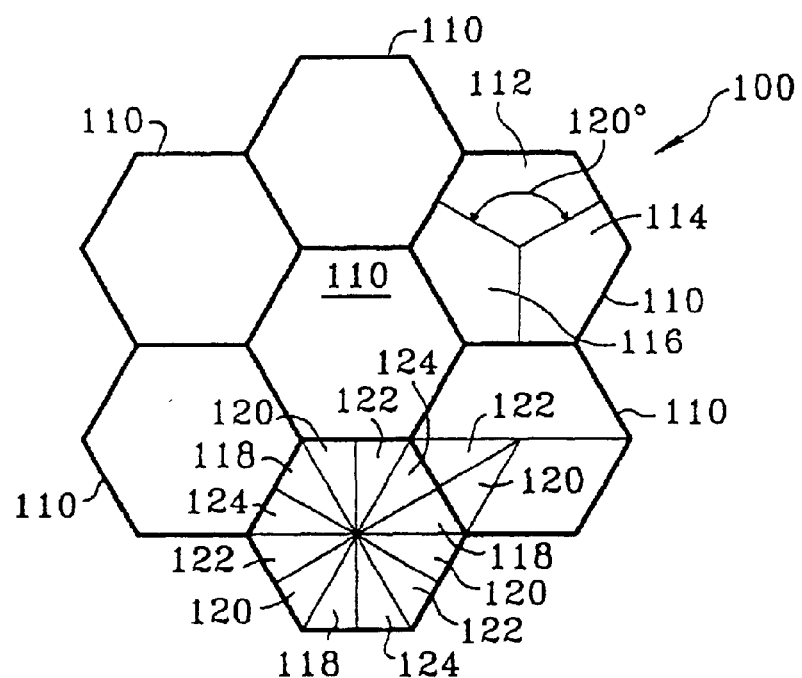
FIG. 3 is a schematic drawing of a basic cell array of the present invention.

Referring to FIG. 3, one example of the basic cell array 100 of the present invention will be described. FIG. 3 shows a plurality of cells 110 that are each divided into three 120° sectors (112, 114, 116), as known to those of ordinary skill in the art. For the purpose of illustration only, the present invention will be described using three 120° sectors that each include four downlink radiation beam patterns per sector. However, it should be noted that each cell may be sectored into other divisions (such as 30° sectors, 60° sectors, etc.), as well as having a lesser or a greater number of beams. It should also be noted that the invention will be described primarily in association with the time division multiplexing (TDM) mode of operation. However, one of ordinary skill in the art should be able to apply the concepts of the present invention to other modes of operation, such as the frequency division multiplexing (FDM) mode. One possible example of such an application has been explained in the Background Section above.

In this example, each sector is served by four beams, with each beam covering a different beam area. These beam coverage areas are numbered, respectively, as beam areas 118, 120, 122, and 124. For the sake of simplicity, only one cell is shown to be divided into the full set of twelve beam areas, and one adjacent cell is shown to be partially divided into two beam areas ( 120, 122 ). However, it should be noted that all of the cells are divided into three sectors with four beams per sector for a total of twelve beam areas. Each of the beams may be formed by any conventional beam-forming apparatus, such as by directional antennas that produce directional radiation beams.

While developing the present invention, the present inventors considered a previous proposal[1] based on a reuse concept in which half of the beams transmit at any one time, whereby interference between adjacent beams is avoided. For example, in a 2/4 reuse scheme, two of the four beams in each four beam sector transmit at a time. Thus, referring to FIG. 3, the beams transmitting to areas 118 and 122 transmit during a first time period, and the beams transmitting to areas 120 and 124 transmit during a second time period. Such an alternating transmission sequence eliminates interference between adjacent beams with areas overlapping each other (both within a single cell and across adjacent cells) because adjacent beams do not transmit at the same time, and therefore the overlap is eliminated. The capacity of this 2/4 scheme was calculated to be 32.7 Mbps in a cell capacity simulation with adaptive modulation and coding, as well as with fast cell selection with a DVB-T code set, and a cell capacity per 5 MHz. These simulations, which were conducted under the same conditions as the simulation discussed in the Background Section above, reveal that the 2/4 reuse scheme has a higher capacity than either the 3/3 scheme or the 4/4 scheme. However, even higher capacities are desirable.

[2]Wen Tong, Leo L. Strawczynski, Shalini Periyalwar and Claude Roger, "Multibeam Antenna System for High Speed Data," DOI Number: 11964RO, Ref: 016896/0045.

One drawback of the 2/4 scheme is that, since each beam is being transmitted only during half of the full time period, there is no information being transmitted by that beam during the other half of the time (i.e., when it is in the off state). Thus, potential information transfer capability is being wasted. Accordingly, one important aspect of the preferred embodiment of the present invention relates to a method of reducing this wasted potential by dividing the geographical area covered by each beam into sub-areas.

Figure 4:
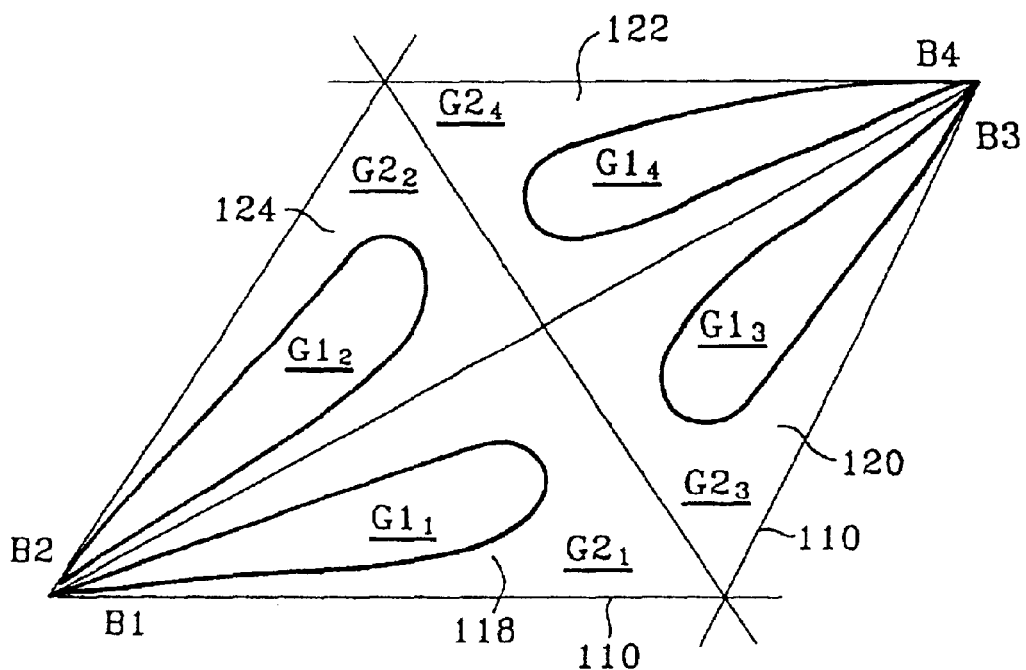
FIG. 4 is a schematic of a set of beam areas and sub-areas of the first embodiment of the present invention.

Referring now to FIGS. 3 and 4, a first preferred embodiment of the present invention will be described. By way of example only, the description will relate to a TDM system having a beam array configured with a re-use factor of 1 (for a reuse factor of n, the beam array is divided into n beam clusters). However, it is contemplated that the concepts of the present invention can be applied to arrays with other re-use factors, as well as to other types of cellular systems, such as an FDM system.

FIG. 3 shows that each cell 110 is divided into three sectors (112, 114, 116), and that each sector is served by four beams (with coverage areas 118, 120, 122, and 124), as with the 2/4 scheme described above. Once again, a different number of sectors, as well as a different number of beams per sector, may be utilized if desired.

FIG. 4 shows an enlargement of two beam areas (from the total of twelve beam areas) in each of two adjacent cells, where the beam areas have been further divided into sub-areas. Beam areas 120 and 122 are from one cell, and beam areas 124 and 118 are from an adjacent cell. As can be seen in this figure, beam area 122 is adjacent to area 120 of the same cell, as well as being adjacent to beam area 124 of the adjacent cell. Beam area 118 is served by beam B1, beam area 124 is served by beam B2, area 120 by B3 and area 122 by B4.

An important feature of the present invention is that the mobile receiving units located within each of the beam areas (118, 120, 122, and 124) are divided into two sub-areas G1 and G2, with regard to the downlink communications assigned to the particular mobile units. Because of the non-uniform geographic distribution of signal levels and interference, G1 and G2 may not be rigid areas with distinguished geographical locations. However, in general, as can be seen from FIG. 4, sub-area $G1_1$ is the region located in the center of radiation beam pattern 118 of beam B1, and sub-area $G2_1$ is the region located outside of area $G1_1$, but still within beam pattern 118. Similarly, sub-area $G1_2$ is located in the center of pattern 124 of beam B2, and sub-area $G2_2$ is located outside of $G1_2$. Sub-areas $G1_3$ and $G2_3$ of beam B3 and sub-areas $G1_4$ and $G2_4$ of beam B4 are also similarly configured.

The different sub-areas G1 and G2 are chosen based upon the overlap of one beam area with an adjacent beam, which depends on both terrain characteristics and beam pattern. Sub-areas $G1_1$, $G1_2$, $G1_3$ and $G1_4$ are the non-overlapping regions, and sub-areas $G2_1$, $G2_2$, $G2_3$, and $G2_4$ are the overlapping regions. Thus, for example, sub-area $G1_1$ is the region of beam area 118 (from beam B1) that does not overlap with adjacent beam area 124 (from beam B2) and beam area 120 (from beam B3), so there will be negligible interference from adjacent beams B2 and B3. On the other hand, sub-area $G2_1$ (of beam area 118) is a region that does include a slight overlap with adjacent beam areas 124 and 120, so some interference from these adjacent beams may result.

Figure 6:
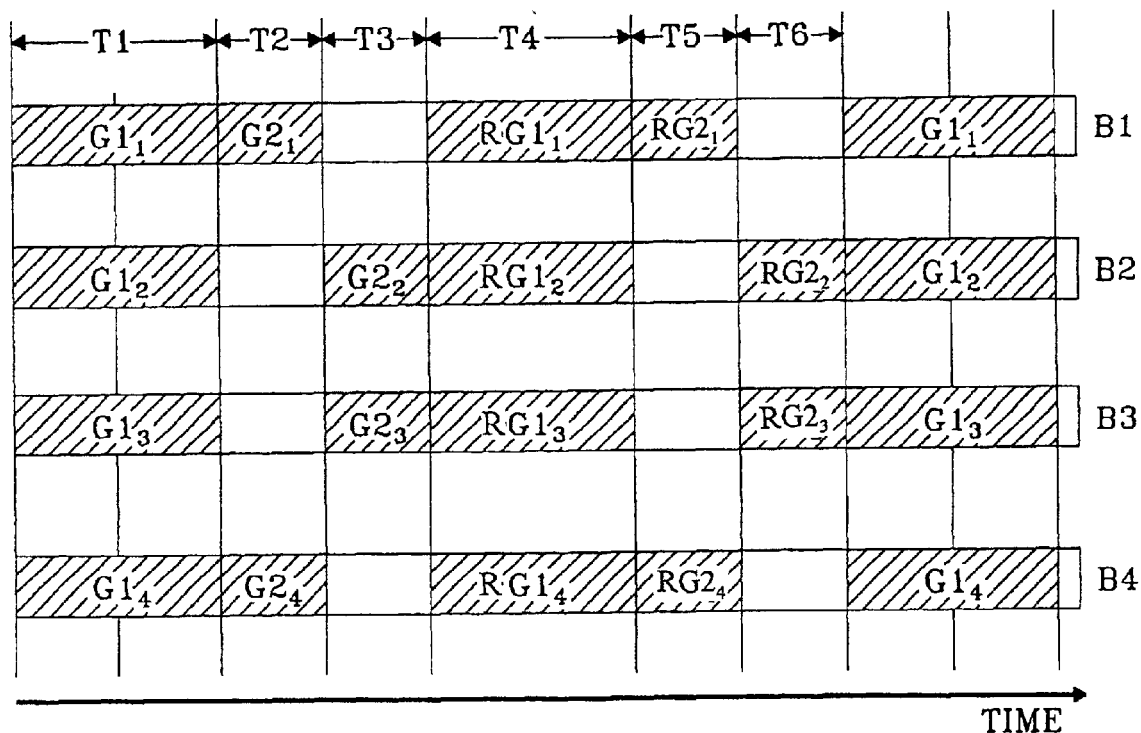
FIG. 6 is a time chart for the first embodiment.

In order to avoid interference from adjacent beams (when operating in the TDM mode), the present invention utilizes a scheme whereby the transmissions to the mobile units that are located in sub-areas G1 are separated in time from the transmissions to the mobile units located in sub-areas G2. Referring now to FIG. 6, which is a chart showing the different time periods for transmission to the different sub-areas by each beam, a preferred embodiment of the interference avoidance scheme of the present invention will be explained. In this figure, the shaded areas represent time periods where transmissions to mobile units within a particular sub-area are being made. The location of a particular mobile, i.e., which sub-area it is positioned in, may be determined by any of the methods known in the art, such as by reviewing the carrier to interference ratio (C/I) of signals received by the mobile unit, by pilot measurements, etc. The location of the border between sub-area G1 and sub-area G2 may be decided upon when the system is first set-up by running a simulation, or it may be changed dynamically based upon the loading distributions. One example of an mobile optimum assignment methodology is described below.

In the preferred embodiment, an optimum methodology to assign a mobile unit to sub-area G1 or to sub-area G2 area is based on the C/I measurement that the mobile unit experiences. The mobile unit measures C/I during a 4/4 cycle (CI4), as well as during a 2/4 (CI2) cycle. Depending on the code/modulation levels available in the system for dynamic rate changes, let us assume that these two C/I values will correspond to rates R4 and R2, respectively, for the 4/4 cycle and the 2/4 cycle (i.e., the mobile unit will receive the R4 rate if it is assigned to the G1 sub-area and the mobile unit will use the R2 rate if it is assigned to G2 sub-area).

It is advisable to assign the mobile unit to the G2 sub-area only if its R2 value is larger than twice the R4 value because, during the transmission to a G2 mobile unit, only half of the beams can be used, effectively reducing the contribution to capacity by a factor two. Otherwise (if the R2 value is equal to or less than twice the R4 value), the mobile unit should be assigned to the G1 sub-area.

In a similar way, if we choose three reuse schemes, 4/4, 2/4 and 1/3, the assignment of mobiles to a corresponding sub-area (G1, G2 or G3, such as shown in FIG. 6) can be done according to the following rule. Let the rate that can be supported for a given mobile unit by each scheme be R1 R2 and R3, respectively, as described above. Then, compare R1 R2/2 and R3/3, and assign the mobile unit to G1, G2 or G3, respectively, depending on whether R1, R2/2 or R3/3 is the largest.

While still referring to FIG. 6, as well as to FIG. 4, the operation of the particular beam formers during each time period will be described next. First, during time period T1, all four beams, B1, B2, B3, B4, make simultaneous transmissions, carrying information signals intended specifically for the mobile units that are located within the beam's particular sub-area G1. Thus, during time T1, beam B1 only transmits information intended for receipt by mobile units located within sub-area $G1_1$; beam B2 only transmits information intended for receipt by mobile units located within sub-area $G1_2$; beam B3 only transmits information intended for receipt by mobile units located within sub-area $G1_3$; and beam B4 only transmits information intended for receipt by mobile units located within sub-area $G1_4$. Since the mobiles for the G1 areas are selected such that there is enough 'open space' between sub-areas $G1_1$, $G1_2$, $G1_3$, and $G1_4$, the signals do not overlap each other, and no interference is created. One selection methodology is discussed in more detail below.

In time period T2, only beams B1 and B4 transmit, and not beams B2 and B3. Moreover, beam B1 is configured to only transmit information intended for mobile units located within sub-area $G2_1$, and beam B4 only transmits information intended for units located within sub-area $G2_4$. As can be seen in FIG. 4, there is essentially no overlap between sub-areas $G2_1$ and $G2_4$, so only a slight amount of interference is possible with the transmissions made during time period T2.

Figure 5:
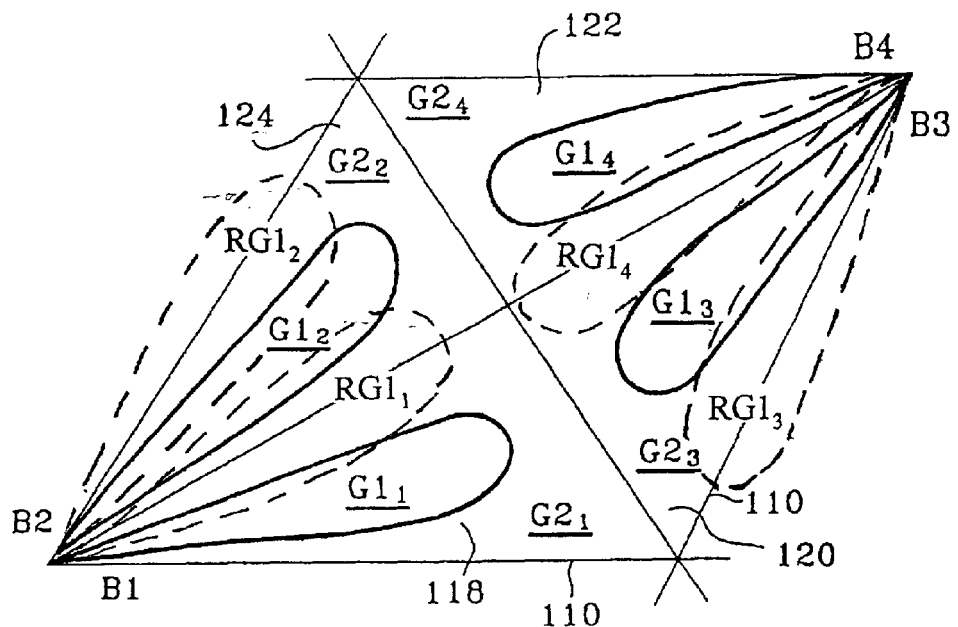
FIG. 5 shows the schematic of FIG. 4 with the beams rotated.

Time period T3 is similar to time period T2, except the other group of beams now transmit information intended for mobiles located with their associated G2 sub-areas. Thus, beam B2 only transmits information intended for mobile units located within sub-area $G2_2$, and beam B3 only transmits information intended for units located within sub-area $G2_3$. In the T3 time period, as with the T2 time period, interference from adjacent beam signals is reduced because sub-areas $G2_2$ and $G2_3$ do not overlap each other. The T4, T5 and T6 time periods are essentially the same as time periods T1, T2 and T3, respectively, except that during time periods T4, T5 and T6, all of the beams are rotated by half of the average beamwidth of all of the beams in order to increase the number of users in the G1 beam areas (the inner beam areas). FIG. 5 shows one example of how the beams may be rotated, where the dashed lines represent the rotated sub-areas. Thus, $RG1_1$ is rotated sub-area $G1_1$, $RG1_2$ is rotated sub-area $G1_2$, etc. Although not shown in the drawings (for the sake of simplicity), the G2 sub-areas will also be rotated to correspond to the G1 sub-areas. In this example, each beam is rotated by half of the average beamwidth, since there are two positions (a rotated position and an original position). However, there may be other numbers of rotated positions (n), in which case the beams are rotated by 1/n th of a beamwidth into each new position. Since the G1 areas use a reuse factor of 1, the overall throughput increases as a result. In addition, this provides more uniform coverage to users, thus increasing the fairness of the system.

In the preferred embodiment, time periods T1, T2, T3, T4, T5 and T6 are selected so that they are proportional to the number of users assigned to these time slots, so that there is a fair allocation of users. Under the assumption that there is a uniform geographical distribution of the users, T1=T4 and T2=T3=T5=T6. These time periods are preferably an integer multiple of the minimum time period that can be allocated to a single user in a system. For example, in a proposed 1×EV scheme, this time interval is 1.67 msec (where 1×EV stands for the enhanced standard for cdma2000). Of course, it is contemplated that other time ranges, as well as other ratios of T1, T2 and/or T3 may also be utilized.

T1, T2, T3, G1, and G2 are selected according to the following formula if the goal is to allocate equal resources to each mobile (note that equal resource allocation does not mean equal throughput for individual mobiles):

$$T1/(T2+T3)=N1/N2=X,$$

where N1 and N2 are the number of mobiles assigned to G1 and G2, respectively, and there is an optimum value of X for a given beam arrangement which maximizes the overall system throughput.

When the geographical distribution of the mobiles is not uniform, different beams will have different number of mobiles in the G1 and G2 areas, and the ratio between the overall duty cycles T1/(T2+T3) needs to be chosen by averaging out the ratio N1/N2 over a long period of time, for example, over more than 100 time slots. In this way, unfair allocation of time slots between the G1 mobiles and the G2 mobiles can be minimized. On the other hand, if desired, the system can provide an unfair allocation to increase the capacity by increasing the duty cycle for the G1 mobiles, i.e., by choosing T1/(T2+T3) >average (N1/N2). Also, if we assign the G2 mobiles double the time slots allocated to the G1 mobiles, to account for 50% active time, the capacity improvement will be decreased.

In the preferred embodiment, the selection of G1 or G2 is done based on the following C/I measurements. For both rotated and non-rotated positions, C/I is measured using pilots included in corresponding time slots. The data rate that can be supported by each beam can be found based on the C/I measurements using the code set performance tables usually available for the modulation and coding sets that are being used. Assume, for a given mobile, the best rates (from all the beams) that can be supported in the time slots T1, T2, T3, T4, T5 and T6 are r1, r2, r3, r4, r5 and r6, respectively. T1, T2, T3 are dedicated for the non-rotated beam position, and T4, T5 and T6 are dedicated for the rotated beam position. T1 and T4 use a reuse of 1 (i.e., belong to G1 mobiles) while T2, T3, T5 and T6 use a reuse of 2 (G2 mobiles—alternating transmissions). The following decision rules can be used to assign the mobiles to each beam and time slot:

Let R1=max(r1, r4), R2=max (r2, r3, r5, r6) (i.e., R1 is the best rate for the mobile if it is allocated to a G1 area, R2 is the best rate for the mobile if it is allocated to a G2 area).

Then,

If $2R1 \geq R2$:

The mobile is assigned to a 4/4 scheme or a G1 area;

if $r1 \geq r4$, the mobile is served in the original (non-rotated) beam position, else the mobile is served in the rotated position.

endif

Else:

The mobile is assigned to a 2/4 scheme or a G2 area;

If max(r2, r3)>max (r5, r6), the mobile is served in the original (non-rotated) beam position with a 2/4 scheme and the time slot T2 or T3 (or the corresponding beams) is selected based on whether r2>r3 or not.

else the mobile is served in the rotated position and the time slot T5 or T6 (or the corresponding beams) is selected based on whether r5>r6 or not.

endif endif

Instantaneous imbalances of loading in each beam/beam position can easily be addressed by modifying the above equations to take into account the loading situation of the beams.

In addition, if a multi-user detection (MUD) scheme is applied to the present invention, there should be a greater increase in capacity than that found in a 2/4 scheme (which rose from 32.7 to 55.6 Mbps when a MUD scheme was applied). This is the case because of the lower levels of interference present in the 2/4 scheme.

In accordance with another aspect of the present invention, the static interference avoidance technique described above for use with a TDM scheme can also be applied with an FDM scheme. Such a system will be briefly explained while referring back to FIG. 4. However, the beam rotation aspect of the invention will not be described for the FDM scheme since it should be apparent to those of ordinary skill in the art that beam rotation can be applied to the FDM scheme in a similar manner to that described above for the TDM scheme.

When the present invention is applied with a FDM scheme, the frequencies being transmitted within each cell are divided into two groups—one group for the mobile in units in the G1 sub-areas and a second group for the mobile units in the G2 sub-areas, and this second group is again divided in half, with one sub-group of frequencies being allocated to the $G2_1$ and $G2_4$ sub-areas and the other sub-group being allocated to the $G2_2$ and $G2_3$ sub-areas. Thus, half of the frequencies allocated to the cell are transmitted for receipt by mobile units located within sub-areas $G1_1$, $G1_2$, $G1_3$ and $G1_4$; one quarter of the frequencies are transmitted for receipt by mobile units located within sub-areas $G2_1$ and $G2_4$; and the final quarter of the frequencies are transmitted for receipt by mobile units located within sub-areas $G2_2$ and $G2_3$. In the FDM scheme, all of the frequencies are being transmitted at all times, unlike the TDM scheme in which the G2 sub-areas are only served for a half or other designated portion of the total time.

As a further modification, the present invention can also be applied to a scheme that is somewhat of a hybrid of the FDM and the TDM schemes. In such a hybrid scheme, half of the frequencies are allocated to the G1 sub-areas for transmission at all times (like a pure FDM scheme). The other half of the frequencies are allocated to all of the G2 sub-areas (and are not divided in half again, as in the pure FDM scheme). The half of the frequencies allocated to G2 sub-areas are alternately transmitted for receipt by either the mobile units located within sub-areas $G2_1$ and $G2_4$, or for receipt by the mobile units located within sub-areas $G2_2$ and $G2_3$. Accordingly, with this hybrid TDM/FDM scheme, there are essentially only two primary time periods (compared with the three primary time periods with TDM), a first time period where mobile units within sub-areas $G1_1$, $G1_2$, $G1_3$, and $G1_4$ are served, as well as those in sub-areas $G2_1$ and $G2_4$; and a second time period where mobile units within sub-areas $G1_1$, $G1_2$, $G1_3$, and $G1_4$ are again served, as well as those in sub-areas $G2_2$ and $G2_3$.

Figure 7:
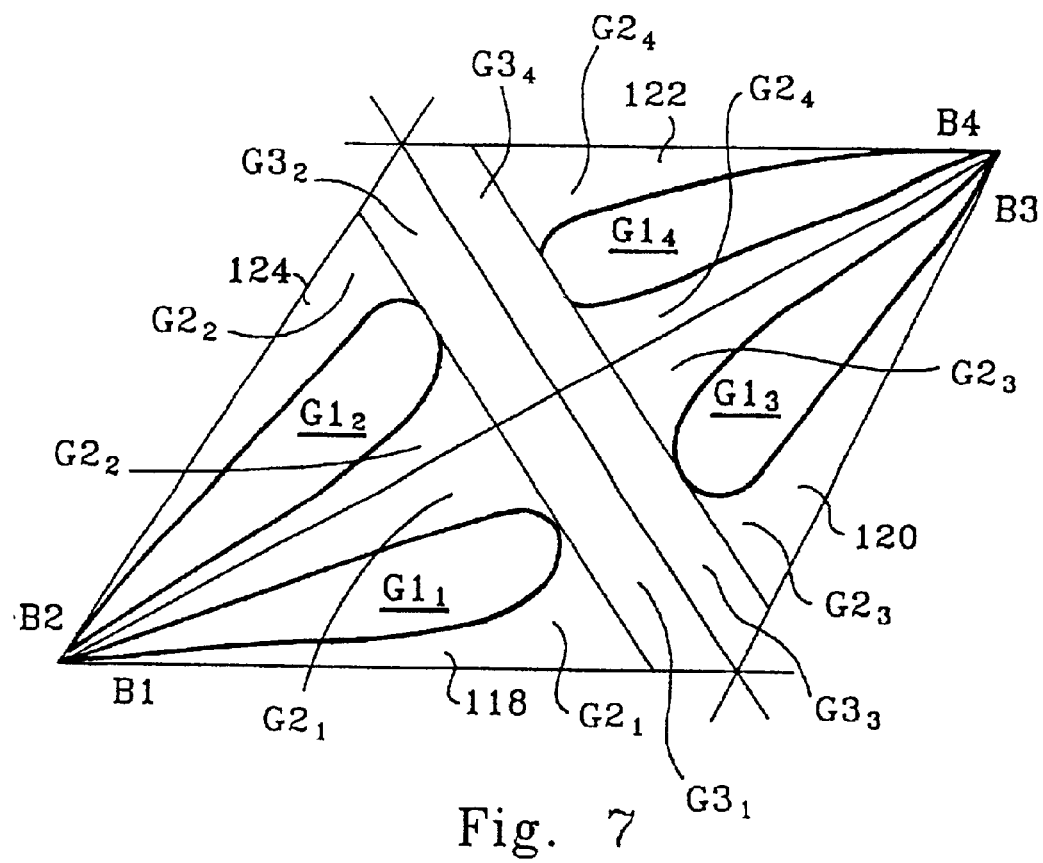
FIG. 7 is a schematic of a set of beam areas and sub-areas of the second embodiment of the present invention.

FIG. 7 shows a second embodiment of the present invention, wherein this embodiment includes a third sub-area G3, in addition to the two sub-areas G1 and G2 described above. For this embodiment, the primary discussion will relate to the present interference avoidance technique as utilized with an FDM scheme, with a brief section discussing its utilization with a TDM scheme.

In this embodiment, the three sub-areas G1, G2 and G3 are divided in the following manner. The G1 sub-areas are those sub-areas where there is one primary beam signal (such as the B1 signal for sub-area $G1_1$), and all of the other signals in that sub-area are of a lower power than a certain threshold power level Y1 (dB). The value of Y1 (and Y2, which is mentioned below), for example, can be between 1 dB and 10 dB, depending on the code/modulation levels available. Y1 (and Y2) are preferably pilot power levels, since it is difficult to do comparisons with C/I values. Thus, the G1 sub-areas are the centers of each of the respective beams, and they are those areas of the highest power.

The G2 sub-areas are those sub-areas where the adjacent beams from the same cell site are relatively strong, but the beams from the adjacent cells are relatively weak. In the G2 sub-areas, the difference between the power levels from one beam to an adjacent beam (from the same cell) is less than a certain threshold power level Y2 (dB), and the power of both of these two beams should be higher than the power of the beams from the adjacent cells, at least by a certain threshold, Y3, where Y2 and Y3 are preferably different from the threshold value Y1 mentioned above. The G3 sub-areas are the sub-areas where the adjacent beams from different cells are relatively strong. In the G3 sub-areas, the difference between the power levels from one beam to a beam from the adjacent cell is less than the threshold Y3 (dB).

In FDM operation, the frequencies allotted to a particular cell are divided into three groups to serve three areas, G1, G2, and G3. The mobiles in the G1 sub-areas are always served with their group of assigned frequencies, and simultaneous transmissions from all of the beams are permitted at all times without any restriction from the other transmissions in the G2 and G3 sub-areas.

The mobiles in the G3 sub-areas are served by a 2/4 pattern with a reuse factor of two. More particularly, half of the G3 frequency spectrum (i.e., one quarter of the cell's full spectrum) is simultaneously transmitted for receipt by mobile units in the $G3_1$ and the $G3_4$ sub-areas, while the other half of the G3 spectrum is also simultaneously being transmitted for receipt in the $G3_2$ and $G3_3$ sub-areas.

Figure 8:
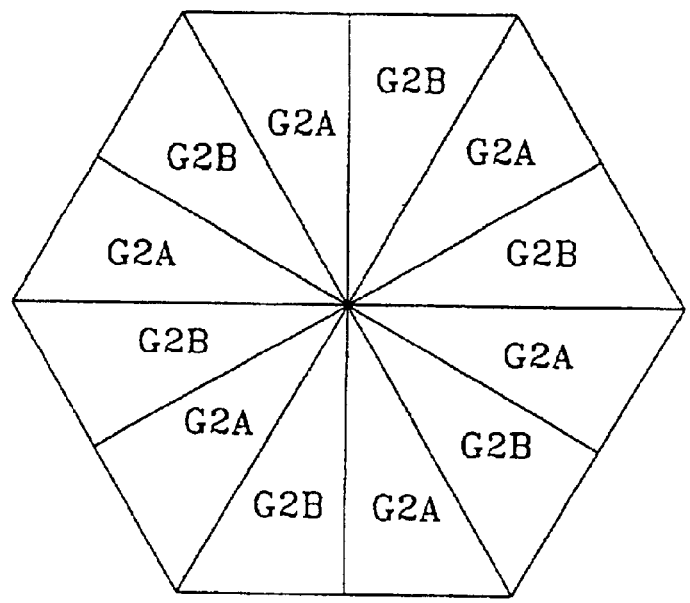
FIG. 8 is a depiction of a scheme for use with the G2 sub-areas with the second embodiment.

For serving the mobile units in the G2 sub-areas, any one of the following three schemes may be utilized. The first scheme is depicted in FIG. 8, which is a schematic of a full cell with a basic 2/4 reuse pattern for the G2 sub-areas. More specifically, with this first scheme, the frequencies assigned to the G2 sub-areas are divided in half, with one half designated as G2A and the other half designated as G2B. Thus, in this example that includes three 120° sectors with four beams per sector, half of the G2 spectrum is simultaneously used twelve times within each cell. Thus, the efficiency of G2 spectrum usage is 0.5 since the reuse factor is 2. Accordingly, if the equivalent throughput in the spectrum allocated to the G2 sub-areas is designated as "g2", then the aggregate throughput per cell equals 12×0.5×g2, which can be reduced to 6×g2.

Figure 9:
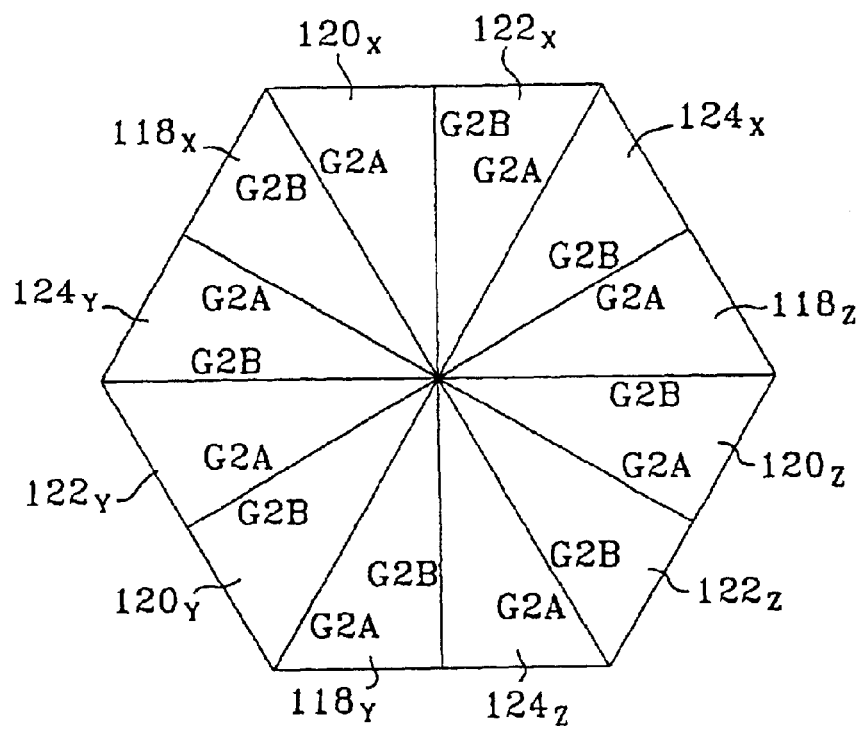
FIG. 9 is a variation on FIG. 8.

The aggregate throughput per cell for the G2 sub-areas can be increased to 8×g2 by using the second scheme, which will be termed the intelligent compact reuse scheme for the G2 sub-areas. FIG. 9 is a schematic of a full cell under this second scheme. Once again, the frequency spectrum assigned to the G2 sub-areas is divided in half (G2A and G2B). However, under this scheme, some of the beams have both halves of the G2 spectrum assigned to them (i.e, both G2A and G2B), and some only have half of the G2 spectrum assigned to them (either G2A or G2B).

In the intelligent compact reuse scheme operation, one of the four beams in each sector is assigned both halves of the G2 frequency spectrum (G2A and G2B), with the G2 sub-area on one side of the G1 sub-area being assigned the G2A frequencies and the G2 sub-area on the other side of the G1 sub-area being assigned the G2B frequencies. Referring back to FIG. 7, and taking beam area 122 as an example, the sub-area $G2_4$ that is below the $G1_4$ sub-area may be assigned the G2A spectrum, and the sub-area $G2_4$ that is above the $G1_4$ sub-area may be assigned the G2B spectrum. These assignments are loosely represented in FIG. 9 by showing that in beam area $122_X$ (where subscript "X" represents that these four beams are in one 120° sector, subscript "Y" represents a second sector, and subscript "Z" the third sector), G2A is shown near the right of this section, and G2A is shown near the left.

Continuing to the left from the beam area $122_X$ with both G2A and G2B included therein, the left side of the G2 sub-area of beam area $120_X$ has been assigned the G2A spectrum of frequencies. By assigning the G2A spectrum here, there will be negligible interference from overlaps with the G2 sub-area of beam area $122_X$, since the far right side of the G2 sub-area of area $122_X$ is the G2A spectrum, and the far left side of the G2 sub-area of area $120_X$ is the G2B spectrum. Still continuing to the left, the right side of the G2 sub-area of area $118_X$ is assigned the G2B spectrum so as not to interfere with the G2A spectrum of the G2 sub-area of area $120_X$. The next area, beam area $124_Y$ (which is actually in the next sector), is similar to area $122_X$ in that it includes the G2A spectrum on one side of the G1 sub-area and the G2B spectrum on the other side of the G1 sub-area. In the remainder of the areas, as indicated in FIG. 9, it is shown that the G2A spectrum is never directly adjacent to the G2B spectrum.

In order to avoid unfair service being allocated among the G2 sub-areas due to asymmetric allocation of the frequencies as described above, the present invention may optionally include a feature in which we propose to rotate the frequency allocation to beams in successive time slots (although this is similar to TDM, the transmissions are separated primarily based on frequencies). For example, the G2B frequencies allocated to beam $124_X$ will be used for $118_Z$ in the second time slot, the G2A frequencies in $118_Z$ will be used for $120_Z$, the G2A and G2B frequencies of $120_Z$ will be used in $122_Z$, and so on. The capacity calculations will not be affected by this rotation of frequency allocation. It should be noted that after three time slots, the same reuse pattern will be repeated. Since this rotation is used only for inner G2 mobiles, there will be no impact upon the mobiles in the G1 and G3 sub-areas.

In the intelligent compact reuse scheme just described, the efficiency of the usage of the G2 sub-areas is increased by a factor of 4/3 over that of the 2/4 reuse pattern described while referring to FIG. 8. With intelligent compact reuse, half of the G2 spectrum is simultaneously used sixteen times within each cell (for this example that includes three 120° sectors with four beams per sector). Accordingly, if the equivalent throughput in the spectrum allocated to the G2 sub-areas is once again designated as "g2" then the aggregate throughput per cell equals 16×0.5×g2, which can be reduced to 8×g2 (which is an increase over the 6×g2 aggregate throughput of the 2/4 scheme of FIG. 8).

Figure 10:
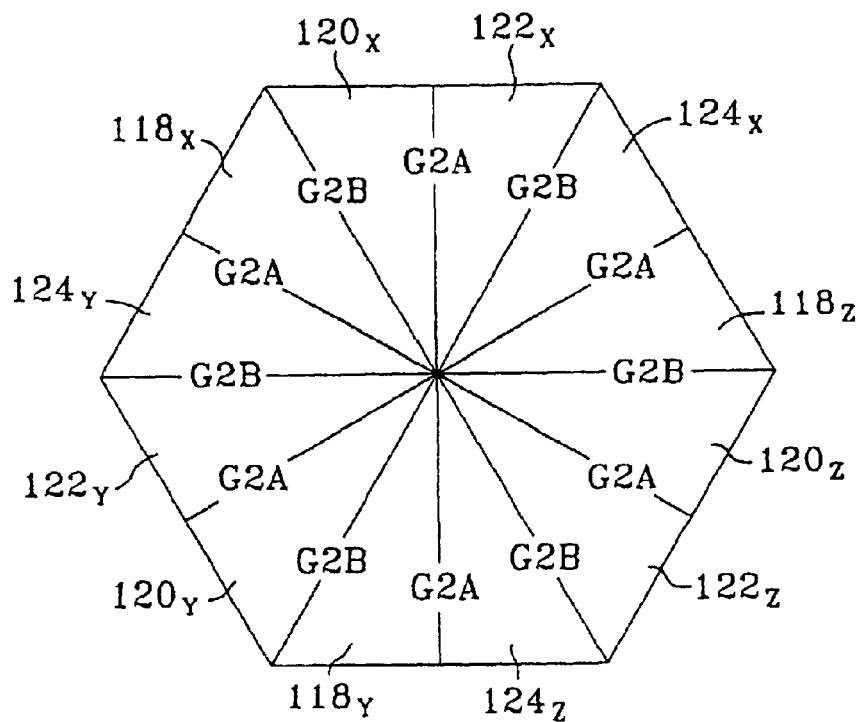
FIG. 10 is another variation on FIG. 8.

The third reuse scheme for the G2 sub-areas is depicted in FIG. 10, which shows a reuse pattern combined with a softer handoff scheme. With this scheme, as with the schemes of FIGS. 8 and 9, the G2 frequency spectrum is divided in half into frequency groups G2A and G2B. However in this case, one frequency group is assigned to the mobile units located within one G2 sub-areas of one beam and the adjacent G2 sub-area on the adjacent beam. For example, referring back to FIG. 7, the G2A frequency group may be assigned to both the lower sub-area $G2_4$ and to the upper sub-area $G2_3$, which is adjacent to the lower sub-area $G2_4$. On the other hand, the upper sub-area $G2_4$, as well as the lower sub-area $G2_3$, will both be assigned the G2B frequency group. Thus, as shown in FIG. 10, frequency group G2A alternates with frequency group G2B at the interfaces between each beam area. Since the same frequency group is used across a dividing line between beam areas, there is a softer handoff between adjacent beams since a particular mobile will be simultaneously receiving signals from two adjacent beams of the same frequency.

In the scheme of FIG. 10, the efficiency of G2 usage is 0.5 because the reuse factor is two, which is the same as the 2/4 pattern of FIG. 8. As also similar to the 2/4 pattern, half of the G2 spectrum is simultaneously used twelve times within each cell. However, the aggregate throughput per cell of the FIG. 10 scheme is higher than that of the FIG. 8 scheme due to a gain from the softer handoff. More specifically, the aggregate throughput per cell for this scheme equals 12×0.5×g2×k=6×g2×k, where k is the softer handoff gain from the mobile unit receiving simultaneous transmissions from two different beams (where this gain, k, can be as high as 2). Accordingly, the aggregate throughput per cell for the FIG. 10 scheme is expected to be higher than that of the FIG. 8 scheme.

Although it will not be fully described herein, the second embodiment of the present invention (shown in FIGS. 7–10) can also be employed with a TDM scheme, instead of with the FDM scheme discussed above, and each of the three variations of the G2 reuse schemes described above can be applied to the TDM arrangement.

It is also contemplated that the areas can be divided into more than the three sub-areas described above, and that similar reuse groups can be identified for these sub-areas. For example, the G3 area discussed above can be subdivided into three areas, G3A, G3B and G3C, where the G3A area is the area in the middle of the G3 area, and the mobile in this area will have two strong beams (from two different cells), with all of the other beams being relatively weak. The G3B mobiles can see three relatively strong beams, with all other beams being relatively weak. Similarly, the G3C mobiles can see four or more strong beams. The reuse factor of these areas should be higher as the number of interferers are large. On the other hand, these mobiles can benefit more from the soft handoff described above, and such a design should be relatively straightforward.

While particular embodiments of the present interference avoidance techniques have been shown and described, it will be appreciated by those skilled in the art that changes and modifications may be made thereto without departing from the invention in its broader aspects and as set forth in the following claims.

What is claimed is:

1. A wireless communications system comprising:
   at least four beam formers arranged within a cellular communications network, said beam formers including a first beam former for transmitting a first beam (B1) into a first area and a second beam former for transmitting a second beam (B2) into a second beam area, where said second beam area is adjacent said first beam area, and a third beam former for transmitting a third beam (B3) into a third beam area and a fourth beam former for transmitting a fourth beam (B4) into a fourth beam area, where said fourth beam area is adjacent said third beam area;
   a mobile switching center for controlling signals transmitted from said at least four beam formers, including sending coded signals along said beams B1, B2, B3 and B4 such that:
      each of said first, second, third and fourth beam areas are effectively divided into at least two sub-areas such that said first beam area includes sub-areas $G1_1$ and $G2_1$, said second beam area includes sub-areas $G1_2$ and $G2_2$, said third beam area includes sub-areas $G1_3$ and $G2_3$, and said fourth beam area includes sub-areas $G1_4$ and $G2_4$; and
      wherein during a first time period (T1), simultaneous transmissions are made for receipt by mobile units located within sub-areas $G1_1$, $G1_2$, $G1_3$ and $G1_4$;
      during a second time period (T2), transmissions are made for receipt by mobile units located within sub-areas $G2_1$ and $G2_4$; and
      during a third time period (T3), transmissions are made for receipt by mobile units located within sub-areas $G2_2$ and $G2_3$.

2. The wireless communications system according to claim 1, wherein said sub-areas $G1_1$, $G1_2$, $G1_3$ and $G1_4$ are areas with little or no interference from adjacent beams and said sub-areas $G2_1$, $G2_2$, $G2_3$ and $G2_4$ are areas with greater interference from adjacent beams.

3. The wireless communications system according to claim 1, wherein:

said sub-area $G1_1$ begins near an apex of said first area and extends generally down a center of said first area, and said sub-area $G2_1$ is located outside of said sub-area $G1_1$; and said sub-area $G1_2$ begins near an apex of said second area and extends generally down a center of said second area, and said sub-area $G2_2$ is located outside of said sub-area $G1_2$.

4. The wireless communications system according to claim 1 wherein said first and second areas are divided into sub-areas $G1_1$, $G2_1$, $G1_2$, and $G2_2$ based upon the carrier-to-interference ratio (C/I) of signals being received within each sub-area.

5. The wireless communications system according to claim 1, wherein said beams B1, B2, B3 and B4 are each rotated by half of the average beamwidth of all of the beams, thereby creating new sub-areas $RG1_1$ and $RG2_1$ in said first beam area, new sub-areas $RG1_2$ and $RG2_2$ in said second beam area, new sub-areas $RG1_3$ and $RG2_3$ in said third beam area and new sub-areas $RG1_4$ and $RG2_4$ in said fourth beam area, so that each mobile now has the option of selecting from either the rotated beams or the original beams, giving rise to more directed beams for the mobiles, thereby increasing both coverage and overall throughput.

6. The wireless communications system according to claim 5, wherein:

during a fourth time period (T4), simultaneous transmissions are made for receipt by mobile units located within said sub-areas $RG1_1$, $RG1_2$, $RG1_3$ and $RG1_4$;

during a fifth time period (T5), transmissions are made for receipt by mobile units located within said sub-areas $RG2_1$ and $RG2_4$; and during a sixth time period (T6), transmissions are made for receipt by mobile units located within said sub-areas $RG2_2$ and $RG2_3$.

7. The wireless communications system according to claim 6, wherein each mobile unit is assigned to a beam and a rotation position based on the following criteria, wherein, for a given mobile, the best rates from all the beams that can be supported in said time slots T1, T2, T3, T4, T5 and T6 are, respectively, r1, r2, r3, r4, r5 and r6, and further wherein R1=max (r1, r4) and R2=max (r2, r3, r5, r6):

if $2R1 \geq R2$ and $r1 \geq r4$, then mobile unit is served in said sub-area $G1_1$, $G1_2$, $G1_3$ or $G1_4$;

if $2R1 \geq R2$ and $r1 < r4$, then mobile unit is served in said sub-area $RG1_1$, $RG1_2$, $RG1_3$ or $RG1_4$;

if $2R1 < R2$ and max (r2, r3)>max (r5, r6) and $r2 \geq r3$, then mobile unit is served in said sub-area $G2_1$ or $G2_4$;

if $2R1 < R2$ and max (r2, r3)>max (r5, r6) and $r2 < r3$, then mobile unit is served in said sub-area $G2_2$ or $G2_3$;

if $2R1 < R2$ and max (r2, r3)$\leq$max (r5, r6) and $r5 \geq r6$, then mobile unit is served in said sub-area $RG2_1$ or $RG2_4$; and if $2R1 < R2$ and max (r2, r3)$\leq$max (r5, r6) and $r5 < r6$, then mobile unit is served in said sub-area $RG2_2$ or $RG2_3$.

8. The wireless communications system according to claim 1, wherein said beams B1, B2, B3 and B4 are each rotated by a portion of their beamwidth that is approximately equal to 1/nth of the average beamwidth, where n is the total number of rotated positions for each beam, thereby creating new sub-areas, and further wherein said new sub-areas are served by time periods other than said first, second and third time periods.

9. A method for reducing interference in a wireless system including at least two beam formers and a plurality of mobile units, the method comprising the steps of:

transmitting a first beam (B1) from a first beam former into a first area, defining two sub-areas within said first area as sub-area $G1_1$ and sub-area $G2_1$;

transmitting a second beam (B2) from a second beam former into a second area, defining two sub-areas within said second area as sub-area $G1_2$ and sub-area $G2_2$;

coding signals of said beams B1 and B2 for receipt by a particular mobile unit based upon whether the particular mobile unit is located within said sub-area $G1_1$, said sub-area $G2_1$, said sub-area $G1_2$ or said sub-area $G2_2$, such that:

during a first time period (T1), making simultaneous transmissions from both said first and second beam formers for receipt by mobile units located, respectively, within said sub-area $G1_1$, or within said sub-area $G1_2$;

during a second time period (T2), making transmissions from said first beam former for receipt by mobile units located within said sub-area $G2_1$; and during a third time period (T3), making transmissions from said second beam former for receipt by mobile units located within said sub-area $G2_2$.

10. The method according to claim 9, wherein:

said first area is adjacent to said second area;

said sub-area $G1_1$ begins near an apex of said first area and extends generally down a center of said first area, and said sub-area $G2_1$ is located outside of said sub-area $G1_1$; and said sub-area $G1_2$ begins near an apex of said second area and extends generally down a center of said second area, and said sub-area $G2_2$ is located outside of said sub-area $G1_2$.

11. The method according to claim 10, wherein said sub-areas $G1_1$ and $G1_2$ are each generally teardrop-shaped.

12. The method according to claim 9, wherein said first and second areas are divided into said sub-areas $G1_1$, $G2_1$, $G1_2$, and $G2_2$ based upon the carrier-to-interference ratio (C/I) of signals being received within each sub-area.

13. The method according to claim 9, wherein a mobile unit is assigned to one of said sub-areas $G1_1$, $G2_1$, $G1_2$, and $G2_2$ according to the following process:

measuring the carrier-to-interference ratio (C/I) for a mobile unit during a 4/4 cycle to define a first rate;

measuring the carrier-to-interference ratio (C/I) for a mobile unit during a 2/4 cycle to define a second rate; and comparing said first rate to said second rate, and if said second rate is larger than twice said first rate, assigning said mobile unit to said sub-area $G2_1$ for said beam B1, or to said sub-area $G2_2$ for said beam B2, otherwise said mobile unit is assigned to said sub-area $G1_1$ for said beam B1, or to said sub-area $G1_2$ for said beam B2.

14. The method according to claim 9, further comprising:

transmitting a third beam (B3) from a third beam former into a third area, defining two sub-areas within said third area as sub-area $G1_3$ and sub-area $G2_3$;

transmitting a fourth beam (B4) from a fourth beam former into a fourth area, defining two sub-areas within said fourth area as sub-area $G1_2$ and sub-area $G2_2$;

coding signals of said beams B3 and B4, such that:
during said period T1, making simultaneous transmissions from said third and fourth beam formers for receipt by mobile units located, respectively, within said sub-area $G1_3$ or within said sub-area $G1_4$; and during said period T2, making transmissions from said fourth beam former for receipt by mobile units located within sub-area $G2_4$; and during said period T3, making transmissions from said third beam former for receipt by mobile units located within sub-area $G2_3$.

15. The method according to claim 14, further comprising:
rotating beams B1, B2, B3 and B4 by a portion of their respective beamwidths, thereby creating new sub-areas $RG1_1$ and $RG2_1$ in said first beam area, new sub-areas $RG1_2$ and $RG2_1$ in said second beam area, new sub-areas $RG1_3$ and $RG2_2$ in said third beam area and new sub-areas $RG1_4$ and $RG2_4$ in said fourth beam area; and coding signals of said beams B1, B2, B3 and B4 such that:
during a fourth time period (T4), simultaneous transmissions are made for receipt by mobile units located within said sub-areas $RG1_1$, $RG1_2$, $RG1_3$ and $RG1_4$;

during a fifth time period (T5), transmissions are made for receipt by mobile units located within said sub-areas $RG2_1$ and $RG2_4$; and during a sixth time period (T6), transmissions are made for receipt by mobile units located within said sub-areas $RG2_2$ and $RG2_3$.

16. The method according to claim 9, wherein said time period T1 is longer than both said time period T2 and said time period T3.

17. The method according to claim 16, wherein said time period T2 is approximately equal in duration to said time period T3.

18. The method according to claim 9, wherein said time periods T1, T2 and T3 are determined according to the formula T1/(T2+T3)=N1/N2=X, where N1 is the number of mobile units assigned to said sub-area $G1_1$ for said beam B1 or to said sub-area $G1_2$ for said beam B2, N2 is the number of mobile units assigned to said sub-area $G2_1$ for said beam B1 or to said sub-area $G2_2$ for said beam B2, and X is a predetermined constant.

19. A method for reducing interference in a wireless system including at least four beam formers and a plurality of mobile units, the method comprising the steps of:
transmitting a first beam (B1) from a first beam former into a first area;

transmitting a second beam (B2) from a second beam former into a second area;

transmitting a third beam (B3) from a third beam former into a third area;

transmitting a fourth beam (B4) from a fourth beam former into a fourth area;

defining at least two sub-areas within each of said first, second, third and fourth beam areas based upon the degree of overlap with adjacent beam areas, whereby each of said beam areas includes at least one overlapping sub-area and at least one non-overlapping sub-area; and coding signals of said beams B1, B2, B3 and B4 for receipt by a particular mobile unit based upon which of said sub-areas the particular mobile unit is located within.

20. The method according to claim 19, wherein said coding is divided into at least three sequential time periods such that the method includes the following additional steps:
during a first time period (T1), making simultaneous transmissions from all four of said beam formers for receipt by mobile units located within said non-overlapping sub-areas;

during a second time period (T2), making transmissions from said first and fourth beam formers for receipt by mobile units located within said overlapping sub-areas within said first and fourth areas; and during a third time period (T3), making transmissions from said second and third beam formers for receipt by mobile units located within said overlapping sub-areas within said second and fourth areas.

21. The method according to claim 19, further comprising the steps of:
defining at least a third sub-area within each of said first, second, third and fourth beam areas based upon the degree of overlap with adjacent beam areas, whereby each of said beam areas includes at least one non-overlapping sub-area and at least two overlapping sub-areas, further defined as a first overlapping sub-area and a second overlapping sub-area;

comparing the strength of each beam signal within a particular sub-area to determine whether a particular mobile unit is located within said non-overlapping sub-area, said first overlapping sub-area or said second overlapping sub-area.

22. The method according to claim 21, further comprising the steps of:
determining that a particular mobile unit is located within said non-overlapping sub-area if the strength of all beam signals but one are less than a threshold value Y1;

determining that a particular mobile unit is located within said first overlapping sub-area if the difference between signal strengths from adjacent beams is less than a threshold value Y2, and the signal strength of said two adjacent beams combined is greater than a threshold value Y3; and determining that a particular mobile unit is located within said second overlapping sub-area if the difference between signal strengths from adjacent beams is less than said threshold value Y3.

23. The method according to claim 22, wherein said threshold values Y1, Y2 and Y3 are all different values from each other.

24. The method according to claim 19, further comprising the steps of:
effectively dividing each of said first, second, third and fourth beam areas into at least two sub-areas such that said first beam area includes sub-areas $G1_1$ and $G2_1$, said second beam area includes sub-areas $G1_2$ and $G2_2$, said third beam area includes sub-areas $G1_3$ and $G2_3$, and said fourth beam area includes sub-areas $G1_4$ and $G2_4$; and assigning a group of frequencies to all of said beam areas within a single cell;

dividing said assigned group of frequencies such that half of said assigned group of frequencies serve mobile units located within sub-areas $G1_1$, $G1_2$, $G1_3$ and $G1_4$, and the other half of said assigned group of frequencies serve mobile units located within sub-areas $G2_1$, $G2_2$, $G2_3$ and $G2_4$.

25. The method according to claim 19, further comprising the steps of dividing the group of frequencies assigned to sub-areas $G2_1$, $G2_2$, $G2_3$ and $G2_4$ in half again, and assigning one sub-group of this group to sub-areas $G2_1$ and $G2_4$ and assigning the other sub-group to sub-areas $G2_2$ and $G2_3$.

26. A beam forming apparatus for use with a wireless communication system, said beamforming apparatus comprising:
   means for transmitting a beam into a first area and for defining two sub-areas within said first area as sub-area G1 and sub-area G2;
   means for coding signals of said beam for receipt by a particular mobile unit based upon whether the particular mobile unit is located within said sub-area G1 or said sub-area G2 such that:
      during a first time period (T1), making transmissions from said beam former for receipt by mobile units located within said sub-area G1, and
      during a second time period (T2), making transmissions from said first beam former for receipt by mobile units located within said sub-area G2.

27. The beam forming apparatus according to claim 26, wherein a mobile unit is assigned to one of said sub-areas G1 or G2 by:
   measuring the carrier-to-interference ratio (C/I) for a mobile unit during a 4/4 cycle to define a first rate;
   measuring the carrier-to-interference ratio (C/I) for a mobile unit during a 2/4 cycle to define a second rate; and
   comparing said first rate to said second rate, and if said second rate is larger than twice said first rate, assigning said mobile unit to said sub-area G2, otherwise said mobile unit is assigned to said sub-area G1.

28. A system of signals for use in a wireless communications system including at least a first beam former and a second beam former and a plurality of mobile units, the signals comprising:
   signals transmitted from the first beam former into a first area, where said first area is divided into at least two sub-areas defined as sub-area $G1_1$ and sub-area $G2_1$;
   signals transmitted from the second beam former into a second area, where said second area is divided into at least two sub-areas defined as sub-area $G1_2$ and sub-area $G2_2$;
   coding said signals from said first and second beam formers for receipt by a particular mobile unit based upon whether the particular mobile unit is located within said sub-area $G1_1$, said sub-area $G2_1$, said sub-area $G1_2$ or said sub-area $G2_2$, such that:
      signals transmitted during a first time period (T1) are transmitted simultaneously from both said first and second beam formers for receipt by mobile units located, respectively, within said sub-area $G1_1$, or within said sub-area $G1_2$;
      signals transmitted during a second time period (T2) are transmitted from said first beam former for receipt by mobile units located within said sub-area $G2_1$; and
      signals transmitted during a third time period (T3) are transmitted from said second beam former for receipt by mobile units located within said sub-area $G2_2$.

29. The system of signals according to claim 28, wherein:
   said first area is adjacent to said second area;
   said sub-area $G1_1$ begins near an apex of said first area and extends generally down a center of said first area, and said sub-area $G2_1$ is located outside of said sub-area $G1_1$; and
   said sub-area $G1_2$ begins near an apex of said second area and extends generally down a center of said second area, and said sub-area $G2_2$ is located outside of said sub-area $G1_2$.

30. The system of signals according to claim 28, wherein said beams B1, B2, B3 and B4 are each rotated by a portion of their respective beamwidths, thereby creating new sub-areas $RG1_1$ and $RG2_1$ in said first beam area, new sub-areas $RG1_2$ and $RG2_2$ in said second beam area, new sub-areas $RG1_3$ and $RG2_3$ in said third beam area and new sub-areas $RG1_4$ and $RG2_4$ in said fourth beam area, said system further comprising:
   coding signals of said beams B1, B2, B3 and B4 such that:
      signals transmitted during a fourth time period (T4) are simultaneously transmitted for receipt by mobile units located within said sub-areas $RG1_1$, $RG1_2$, $RG1_3$ and $RG1_4$;
      signals transmitted during a fifth time period (T5) are transmitted for receipt by mobile units located within said sub-areas $RG2_1$ and $RG2_4$; and
      signals transmitted during a sixth time period (T6) are transmitted for receipt by mobile units located within said sub-areas $RG2_2$ and $RG2_3$.

31. The system of signals according to claim 28, wherein each mobile unit is assigned to a beam and a rotation position based on the following criteria, wherein, for a given mobile, the best rates from all the beams that can be supported in said time slots T1, T2, T3, T4, T5 and T6 are, respectively, r1, r2, r3, r4, r5 and r6, and further wherein R1=max (r1, r4) and R2=max (r2, r3, r5, r6 ):
   if $2R1 \geq R2$ and $r1 \geq r4$, then mobile unit is served in said sub-area $G1_1$, $G1_2$, $G1_3$ or $G1_4$;
   if $2R1 \geq R2$ and r1<r4, then mobile unit is served in said sub-area $RG1_1$, $RG1_2$, $RG1_3$ or $RG1_4$;
   if 2R1<R2 and max (r2, r3)>max (r5, r6) and $r2 \geq r3$, then mobile unit is served in said sub-area $G2_1$ or $G2_4$;
   if 2R1<R2 and max (r2, r3)>max (r5, r6) and r2<r3, then mobile unit is served in said sub-area $G2_2$ or $G2_3$;
   if 2R1<R2 and max (r2, r3)$\leq$max (r5, r6) and $r5 \geq r6$, then mobile unit is served in said sub-area $RG2_1$ or $RG2_4$; and
   if 2R1<R2 and max (r2, r3)$\leq$max (r5, r6) and r5<r6, then mobile unit is served in said sub-area $RG2_2$ or $RG2_3$.

* * * * *